United States Patent
Thompson (10) Patent No.: US 11,731,788 B2
(45) Date of Patent: Aug. 22, 2023

(54) METHOD AND APPARATUS FOR PRODUCING AT LEAST PART OF A STRUCTURAL FRAME OF A VEHICLE

(71) Applicant: BAE Systems plc, London (GB)

(72) Inventor: Gregory Warren Thompson, Preston (GB)

(73) Assignee: BAE Systems plc, London (GB)

( * ) Notice: Subject to any disclaimer, the term of this patent is extended or adjusted under 35 U.S.C. 154(b) by 34 days.

(21) Appl. No.: 17/607,626

(22) PCT Filed: May 7, 2020

(86) PCT No.: PCT/GB2020/051119
§ 371 (c)(1),
(2) Date: Oct. 29, 2021

(87) PCT Pub. No.: WO2020/234565
PCT Pub. Date: Nov. 26, 2020

(65) Prior Publication Data
US 2022/0204183 A1    Jun. 30, 2022

(30) Foreign Application Priority Data

May 23, 2019 (EP) .................................... 19275069
May 23, 2019 (GB) .................................... 1907299

(51) Int. Cl.
*B64F 5/10* (2017.01)
*B64C 1/06* (2006.01)

(52) U.S. Cl.
CPC ............... *B64F 5/10* (2017.01); *B64C 1/061* (2013.01); *B64C 1/064* (2013.01)

(58) Field of Classification Search
CPC ........... B64F 5/10; B64C 1/061; B64C 1/064
See application file for complete search history.

(56) References Cited

U.S. PATENT DOCUMENTS

| 4,945,488 A * | 7/1990 | Carver ............. G05B 19/41805 |
| | | 700/182 |
| 4,956,764 A * | 9/1990 | Carver ............. G05B 19/41865 |
| | | 700/59 |

(Continued)

FOREIGN PATENT DOCUMENTS

| CA | 2554189 A1 | 9/1997 |
| EP | 2853963 A1 | 4/2015 |

(Continued)

OTHER PUBLICATIONS

Office Action for U.S. Appl. No. 16/973,211 dated Jan. 24, 2022, 9 pages.

(Continued)

*Primary Examiner* — Lawrence Averick
(74) *Attorney, Agent, or Firm* — Maine Cernota & Rardin (57) ABSTRACT

A method of producing at least part of a structural frame of a vehicle, the method comprising: providing a support structure (300), the support structure (300) comprising: a plurality of elongate members (301); and one or more retaining members (208) configured to retain the elongate members (301); mounting a plurality of first structural components (206) to the support structure (300) by coupling the first structural components (206) to the elongate members (301) such that each first structural component (206) occupies a different respective position along the elongate members (301); and attaching a plurality of second structural components (204) to the first structural components (206), thereby coupling together the first structural components (206) to form the at least part of the structural frame of a vehicle.

20 Claims, 3 Drawing Sheets

(56) References Cited

U.S. PATENT DOCUMENTS

| | | | | |
|---|---|---|---|---|
| 5,106,290 | A | * | 4/1992 | Carver ............... G05B 19/4097 114/357 |
| 5,516,545 | A | | 5/1996 | Sandock |
| 7,787,979 | B2 | | 8/2010 | Marsh et al. |
| 9,533,359 | B2 | | 1/2017 | Carberry et al. |
| 9,649,820 | B1 | * | 5/2017 | Boone ..................... B64C 1/061 |
| 10,139,808 | B2 | | 11/2018 | Engelbart et al. |
| 10,275,565 | B2 | | 4/2019 | Vasquez et al. |
| 10,596,683 | B2 | * | 3/2020 | Enmar ....................... B64F 5/10 |
| 2003/0033041 | A1 | | 2/2003 | Richey |
| 2006/0231682 | A1 | | 10/2006 | Sarh |
| 2008/0149768 | A1 | * | 6/2008 | Sarh .......................... B64F 5/10 244/120 |
| 2008/0205763 | A1 | | 8/2008 | Marsh |
| 2008/0223985 | A1 | | 9/2008 | Marsh et al. |
| 2008/0254403 | A1 | | 10/2008 | Hilliard |
| 2008/0256788 | A1 | | 10/2008 | Glazebrook |
| 2009/0100791 | A1 | | 4/2009 | Kayani et al. |
| 2010/0114519 | A1 | | 5/2010 | Hollingshead |
| 2011/0282483 | A1 | | 11/2011 | Simonetti |
| 2014/0196289 | A1 | | 7/2014 | Hollingshead |
| 2015/0023748 | A1 | | 1/2015 | Carberry et al. |
| 2015/0202824 | A1 | | 7/2015 | De Mattia |
| 2016/0221691 | A1 | | 8/2016 | Enmar |
| 2017/0132355 | A1 | | 5/2017 | Vasquez et al. |
| 2017/0327201 | A1 | | 11/2017 | Doyle |
| 2018/0067476 | A1 | | 3/2018 | Englebart |
| 2018/0101160 | A1 | | 4/2018 | Desjardien |
| 2018/0104775 | A1 | | 4/2018 | Turner |
| 2019/0382135 | A1 | | 12/2019 | Gonzalez |
| 2021/0229835 | A1 | * | 7/2021 | Carberry ................. B64C 1/061 |
| 2021/0237903 | A1 | * | 8/2021 | Coulier .................... B64F 5/10 |
| 2021/0237904 | A1 | * | 8/2021 | Carberry .................. B64F 5/10 |

FOREIGN PATENT DOCUMENTS

| | | | |
|---|---|---|---|
| EP | 2933742 | A1 | 10/2015 |
| EP | 3093723 | A1 | 11/2016 |
| EP | 3210757 | A1 | 8/2017 |
| EP | 3210758 | A1 | 8/2017 |
| EP | 0329056 | A1 | 11/2017 |
| EP | 3244329 | A2 | 11/2017 |
| EP | 3293649 | A1 | 3/2018 |
| GB | 170727 | A | 11/1921 |
| GB | 309110 | A | 4/1929 |
| GB | 2526916 | A | 9/2015 |
| GB | 2541182 | A | 2/2017 |
| JP | 20060350620 | A | 12/2006 |
| WO | 0158753 | A1 | 8/2001 |
| WO | 2007034197 | A1 | 3/2007 |
| WO | 2015038041 | A1 | 3/2015 |
| WO | 2018085190 | A1 | 5/2018 |
| WO | WO-2020002926 | A1 * | 1/2020 ............... B23P 19/04 |

OTHER PUBLICATIONS

Office Action for U.S. Appl. No. 16/972,392 dated Feb. 14, 2022, 27 pages.
International Preliminary Report on Patentability for PCT/GB2019/051824, datede Jan. 7, 2021, 12 pages.
Office Action for U.S. Appl. No. 16/972,392 dated Jan. 13, 2022, 9 pages.
Office Action for U.S. Appl. No. 16/973,211 dated Feb. 22, 2022, 34 pages.
International Search Report and Written Opinion for PCT Appl. No. PCT/GB2019/051823, dated Dec. 12, 2019, 18 Pages.
Search Report for Great Britain Patent Appl. No. 1909255.0, dated Dec. 10, 2019, 5 Pages.
Search Report for Great Britain Patent Appl. No. 1810648.4, dated Dec. 3, 2018, 3 Pages.
Search Report for European Patent Appl. No. 18180582.1, dated Mar. 1, 2019, 13 Pages.
Extended Search Report for European Patent Appl. No. 18180582.1, dated May 24, 2019, 13 Pages.
International Search Report and Written Opinion for PCT Appl. No. PCT/GB2019/051825, dated Dec. 11, 2019, 16 Pages.
Combined Search and Examination Report for Great Britain Patent Appl. No. 1909261.8, dated Dec. 11, 2019, 6 Pages.
Search Report for European Patent Appl. No. 18180583.9, dated Oct. 23, 2018, 11 Pages.
Search Report for Great Britain Patent Appl. No. 1810649.2, dated Dec. 4, 2018, 3 Pages.
International Search Report and Written Opinion for PCT Appl. No. PCT/GB2019/051824, Dec. 10, 2019, 18 Pages.
Search Report for European Patent Appl. No. 18180584.7, dated Oct. 30, 2018, 5 Pages.
Search Report for Great Britain Patent Appl. No. 1810651.8, dated Dec. 10, 2018, 3 Pages.
Search Report for Great Britain Patent Appl. No. 1909259.2, dated Dec. 10, 2019, 4 Pages.
International Search Report and Written Opinion for PCT Appl. No. PCT/GB2019/051826, dated Dec. 10, 2019, 14 Pages.
Combined Search and Examination Report for Great Britain Patent Appl. No. 1909263.4, dated Dec. 10, 2019, 6 Pages.
Search Report for European Patent Appl. No. 18180587.0, dated Oct. 24, 2018, 13 Pages.
Search Report for Great Britain Patent Appl. No. 1810655.9, dated Dec. 4, 2018, 3 Pages.
International Preliminary Report on Patentability for PCT Appl. No. PCT/GB2019/051823, dated Dec. 29, 2020, 12 Pages.
International Preliminary Report on Patentability for PCT Appl. No. PCT/GB2019/051825, dated Dec. 29, 2020, 11 Pages.
International Preliminary Report on Patentability for PCT Appl. No. PCT/GB2019/051824, dated Dec. 29, 2020, 12 Pages.
International Preliminary Report on Patentability for PCT Appl. No. PCT/GB2019/051826, dated Dec. 29, 2020, 10 Pages.
European Search Report for EP Appl. No. 19275069.3 dated Sep. 12, 2019, 8 Pages.
International Search Report for PCT/GB2020/051119 dated Jul. 16, 2020, 14 Pages.
GB Search Report for GB1907299.0 dated Nov. 5, 2019, 3 Pages.
GB2 Search Report for GB2006785.6 dated Oct. 12, 2020, 5 pages.
Office Action for U.S. Appl. No. 16/973,204 dated Jun. 9, 2023, 37 pages.

* cited by examiner

METHOD AND APPARATUS FOR PRODUCING AT LEAST PART OF A STRUCTURAL FRAME OF A VEHICLE

RELATED APPLICATIONS

This application is a national phase application filed under 35 USC § 371 of PCT Application No. PCT/GB2020/051119 with an International filing date of May 7, 2020, which claims priority of GB Patent Application 1907299.0 filed on May 23, 2019 and EP Patent Application 19275069.3 filed on May 23, 2019. Each of these applications is herein incorporated by reference in its entirety for all purposes.

FIELD OF THE INVENTION

The present invention relates to the production of a vehicle frame, including the production of an airframe of an aircraft.

BACKGROUND

Aircraft airframes typically comprise a plurality of frames (or formers) and longerons (or stringers/stiffeners). The frames are typically laterally spaced from one another and arranged perpendicular to the longitudinal axis of the aircraft. The primary purpose of formers is to establish the shape of the fuselage and reduce the column length of the longerons. The longerons are typically elongate members which are attached to the frames and are arranged parallel to the longitudinal axis of the aircraft. The longerons support the aircraft skin and, in use, transfer aerodynamic loads acting on the skin onto the frames.

It is desirable that aircraft airframes are produced to be within very tight tolerance bounds.

Production of an aircraft airframe typically comprises producing two or more separate airframe sections (for example, a fore fuselage section, an aft fuselage section, and a tail section), and subsequently attaching those sections together.

It tends to be very difficult to produce separate airframe sections with a sufficient level of precision to allow for easy assembly of the airframe. Lengthy and expensive shimming processes may be required to fill gaps between the airframe sections when those sections are attached together.

Production of a section of an aircraft airframe typically involves the use of airframe assembly tools designed to support airframe components while they are being worked on and to locate different components together in the correct relative positions during airframe assembly. Traditionally, each different assembly process has required at least one dedicated assembly tool, which is produced specifically for a given set of components and which is designed to support the components in a particular manner so that assembly operations can be carried out without interference from the tool. Such assembly tools are manufactured to exacting standards.

A conventional assembly tool comprises a rigid metal jig whose framework is constructed from welded box section steel. A plurality of pick-up devices is mounted on the framework for carrying the aircraft components during the assembly process, and these too are conventionally produced from welded steel parts.

SUMMARY OF THE INVENTION

Conventional airframe assembly tends to employ the use of packers or shims in order to manage tolerance stack-up during assembly. Conventional airframe assembly typically requires significant quantities of high accuracy assembly and detail manufacturing tooling, temperature-controlled environments, and high accuracy assembly machining. Aspects of the present invention advantageously tend to reduce such requirements.

In a first aspect, the present invention provides a method of producing at least part of a structural frame of a vehicle. The method comprises providing a support structure, the support structure comprising a plurality of elongate members and one or more retaining members configured to retain the elongate members, mounting a plurality of first structural components to the support structure by coupling the first structural components to the elongate members such that each first structural component occupies a different respective position along the elongate members, and attaching a plurality of second structural components to the first structural components, thereby coupling together the first structural components to form the at least part of the structural frame of a vehicle. Each of the first structural components may be coupled to each of the elongate members.

The at least part of a structural frame of a vehicle may be at least a part of an airframe of an aircraft. The first structural components may be frames or formers. The second structural components may be components selected from the group of components consisting of shear webs, longerons, beams, and keels.

Attaching the plurality of second structural components to the first structural components may comprise attaching a second structural component between an adjacent pair of first structural components.

Each of the first structural components may comprise a plurality of through holes. For each first structural component, coupling that first structural components to the elongate members may comprise positioning each elongate member through a respective through hole of that first structural component. A size of each through hole may be larger than the size of the cross section of the elongate member that is positioned through that through hole. Coupling the first structural components to the elongate members such that each first structural component occupies a different respective position along the elongate members may comprise sliding the first structural components along the elongate members.

The elongate members may be tubes.

The method may further comprise providing the plurality of first structural components, comprising providing one or more panels of a material, and cutting the first structural components from the one or more panels. For a first structural component, that first structural component may comprise one or more features via which that first structural component is mounted to the elongate members. The one or more features via which that first structural component is mounted to the elongate members may define a datum with respect to which one or more other features of that first structural component are defined on the one or more panels. The one or more features via which that first structural component is mounted to the elongate members may comprise one or more through holes. The one or more other features of that structural component comprises one or more features selected from the group of features consisting of fastener holes, landings for receiving other structural components, and an edge of that first structural component.

Each of the one or more panels may comprise a core material sandwiched between opposing layers thereby to form a sandwich structure, the sandwich structure being stitched together by stitches passing through a thickness of the sandwich structure.

In a further aspect, the present invention provides at least part of a structural frame of a vehicle producing in accordance with the method of any preceding aspect.

In a further aspect, the present invention provides a support structure for use in assembling at least part of a structural frame of a vehicle. The support structure comprises a plurality of elongate members, each elongate member configured to receive a plurality of vehicle structural components, and one or more retaining members configured to retain the elongate members.

DETAILED DESCRIPTION

Figure 1:
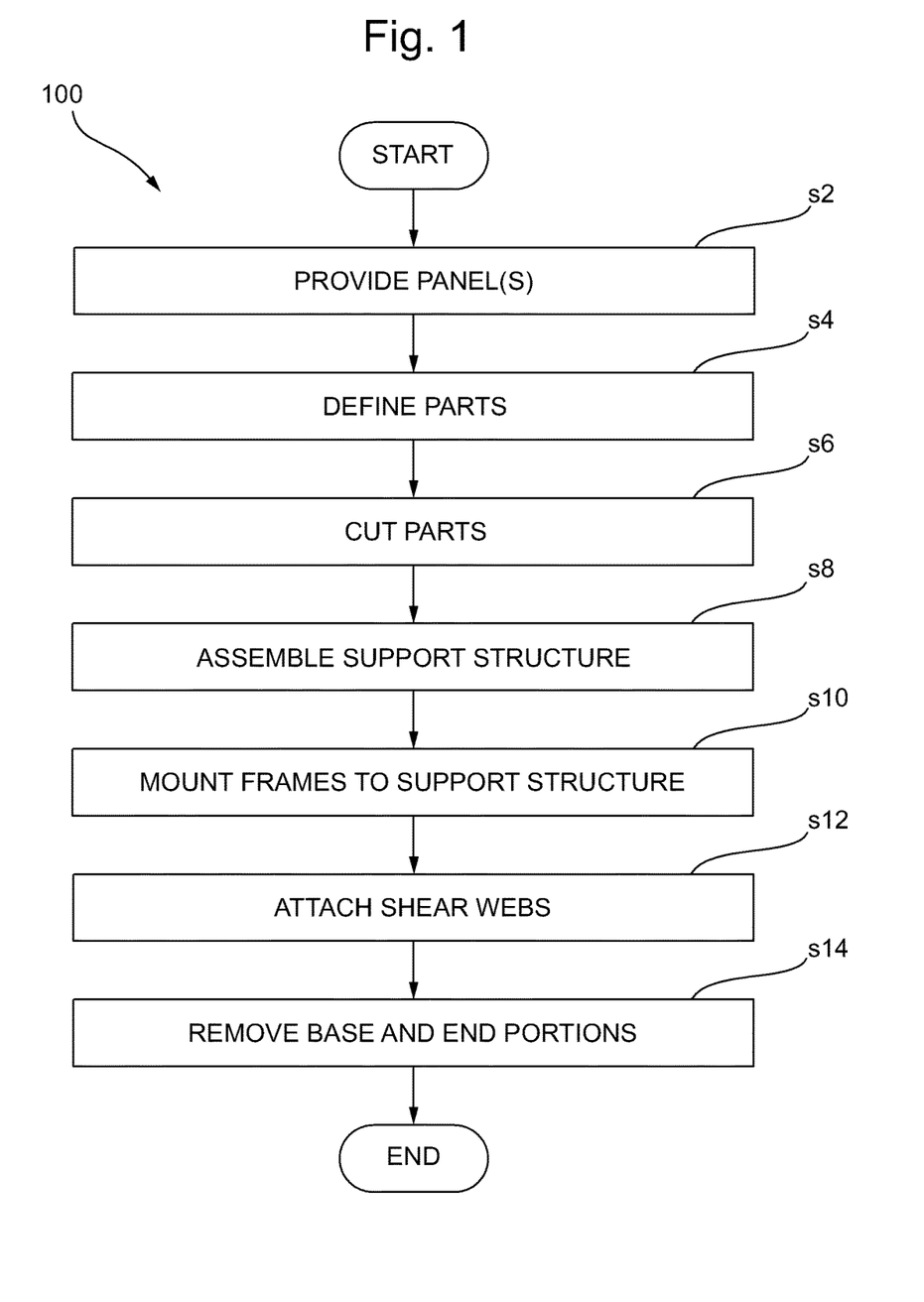
FIG. 1 is a process flow chart showing certain steps of a process of producing an airframe.

FIG. 1 is a process flow chart showing certain steps of an embodiment of a process 100 of producing an airframe of an aircraft.

At step s2, one or more panels are provided. The panels are panels of material from which airframe structural parts are to be produced.

In this embodiment, the one or more panels are Acrosoma® tri-dimensional stitched panels or sandwich panels. The Acrosoma® panels may comprise a foam core (e.g. a closed-cell polyurethane or polyvinylchloride (PVC) foam plate) sandwiched between opposing layers of a fibre mat (e.g. an E-glass fibre mat). The fibre mats form upper and lower panel skins. The whole assembly is stitched together using aramid fibre stitching material which is stitched through the entire panel thickness, i.e. through the upper skin, the foam core, and the lower skin. Resin (such as vinyl ester resin) is injected into the stitched assembly and cured. The resin may substantially saturate the upper and lower skins, and also "pot" the aramid fibre stitching material tying the assembly together.

Any appropriate type of foam core may be used for the one or more panels. Any appropriate type of skin material may be used for the one or more panels, such as material reinforced with glass, aramid and/or carbon fibres. Any appropriate type of stitching material may be used with the one or more panels. Any the one or more panels may be produced using any appropriate type of resin, such as vinylester and epoxy resins.

Advantageously, the Acrosoma® panels may be produced as very long continuous sheets of material. The panels tend to have high bending stiffness. The panels tend to be resistant to damage and buckling. Furthermore, the risk of delamination tends to be low, for example due to stitching together of the core and the skins.

At step s4, a plurality of airframe components is defined on the one or more panels.

Figure 2:
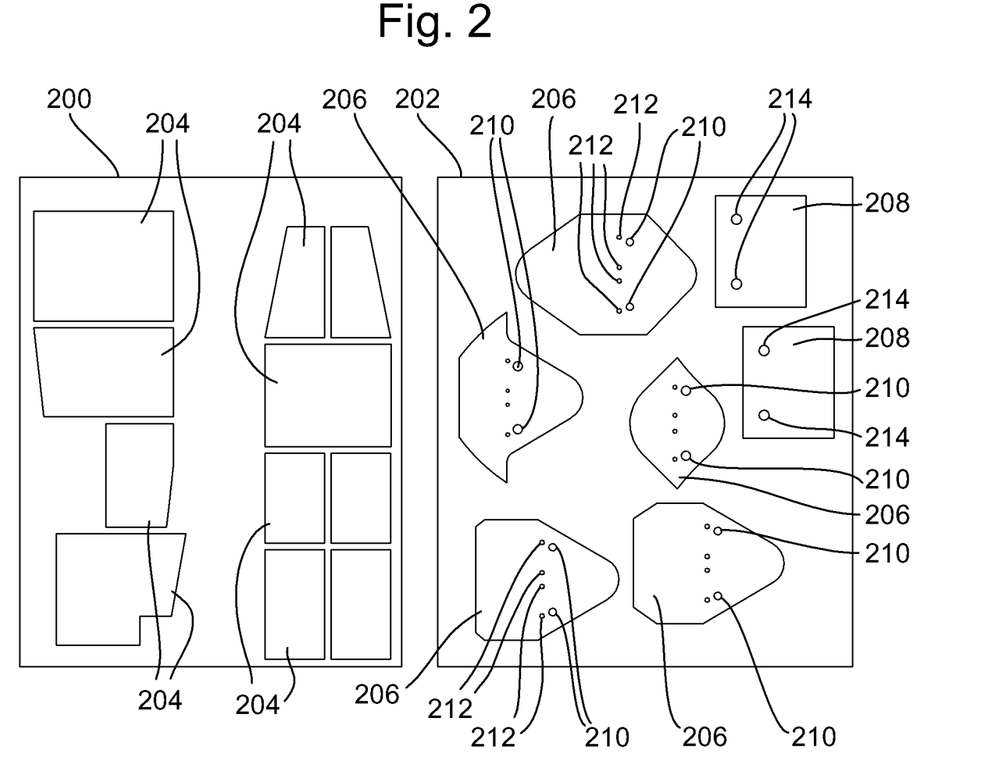
FIG. 2 is a schematic illustration (not to scale) showing panels of material with airframe components defined thereupon.

FIG. 2 is a schematic illustration (not to scale) showing two panels, namely a first panel 200 and a second panel 202, on which a plurality of airframe components is defined. The remaining steps of the process of FIG. 1 will be described in more detail later below after a description of FIG. 2.

In this embodiment, on the first panel 200, a plurality of shear webs 204 are defined. Although eleven shear webs 204 are depicted in FIG. 2, it will be appreciated by those skilled in the art that, in practice, any number of shear webs 204 may be used.

Also, on the second panel 202, a plurality of frames or "formers" 206 are defined. Although five frames 206 are depicted in FIG. 2, it will be appreciated by those skilled in the art that, in practice, any number of frames 206 may be used.

Also, on the second panel 202, two end portions of a support structure, hereinafter referred to as "end portions" 208 are defined.

In some embodiments, the defining of the airframe components 204, 206, 208 may be performed digitally. For example, digital models of the one or more panels 200, 202 may be created and used to define digital models of the airframe components 204, 206, 208. In some embodiments, the airframe components 204, 206, 208 may be marked onto the physical panels 200, 202 for example by drawings or etching outlines of the components 204, 206, 208 onto the panels 200, 202.

In this embodiment, each frame 206 comprises two features that, as described in more detail later below, will be used to mount that frame 206 onto a support structure. In this embodiment, these features are through holes, hereinafter referred to as "first through holes", and are indicated in Figures by reference numerals 210. The first through holes 210 are substantially identical to each other. In this embodiment, for each frame 206, the distance between the two first through holes 210 of that frame 206 is substantially equal to that of each other frame 206.

The frames 206 further comprise a plurality of other features. Example features include, but are not limited to, fasteners holes 212 (i.e. holes for receiving fasteners for fastening the frames 206 to other airframe components), landings for receiving other airframe components (such as the shear webs 204), frame edges that may define at least part of an inner mould line (IML) of the aircraft, and the like.

In this embodiment, for each frame 206, the first through holes 210 of that frame 206 define a datum with respect to which the other features of that frame (for example, the fasteners holes 212, the landings, the frame edges, etc.) are defined.

In some embodiments, a frame 206 may be defined on the second panel 202 as follows. Firstly, positions of the first through holes 210 of that frame 206 on the panel 202 are defined. Outlines of the first through holes 210 may be marked on the panel 202, and/or the first through holes 210 may be drilled or cut through the panel 202. This marking or drilling/cutting of the first through holes 210 may be performed with respect to an overall, or global, datum. Secondly, the positions of the other features of that frame 206 are defined with respect to the first through holes 210 of that frame 206. The positions of the other frame features may be measured with respect to the datum defined by the first through holes 210 of that frame 206. Thus, the frame features of a frame 206 are defined with respect to a respective local datum defined by the first through holes 210 of that frame 206.

In this embodiment, the end portions 208 are structural members that will form part of the support structure upon which the frames 206 and shear webs 204 will be mounted. Each end portion 208 comprises two features that, as described in more detail later below, will be used to hold elongate support members of the support structure. In this embodiment, these features are through holes, hereinafter referred to as the "second through holes", and are indicated in the Figures by reference numerals 214. The second through holes 214 are substantially identical to each other. In this embodiment, the distance between the two second through holes 214 of one end portion 208 is substantially equal to the distance between the two second through holes 214 of the other end portion 208. In some embodiments, the distances between the second through holes 214 of each end portion 208 may be substantially equal to the distances between the first through holes 210 of each frame 206.

The end portions 208 further comprise a plurality of other features. Example features include, but are not limited to, the edges of the end portions 208.

In this embodiment, for each end portion 208, the second through holes 214 of that end portion 208 define a datum with respect to which the other features of that end portion 208 are defined.

In some embodiments, an end portion 208 may be defined on the second panel 202 as follows. Firstly, positions of the second through holes 214 of that end portion 208 on the panel 202 are defined. Outlines of the second through holes 214 may be marked on the panel 202, and/or the second through holes 214 may be drilled or cut through the panel 202. This marking or drilling/cutting of the second through holes 214 may be performed with respect to the global datum. Secondly, the positions of the other features of that end portion 208 are defined with respect to the second through holes 214 of that end portion 208. The positions of the other features of the end portion 208 may be measured with respect to the datum defined by the second through holes 214 of that end portion 208. Thus, the features of an end portion 208 are defined with respect to a respective local datum defined by the second through holes 214 of that end portion 208.

Returning now to the description of FIG. 1, at step s6, the plurality of airframe components 204, 206, 208 are cut out of the panels 200 202.

Preferably, the cutting of the airframe components 204, 206, 208 from the panels 200, 202 is performed using a computer numerical control (CNC) router or cutting machine, such as a laser cutting machine.

At step s8, a support structure is assembled.

Figure 3:
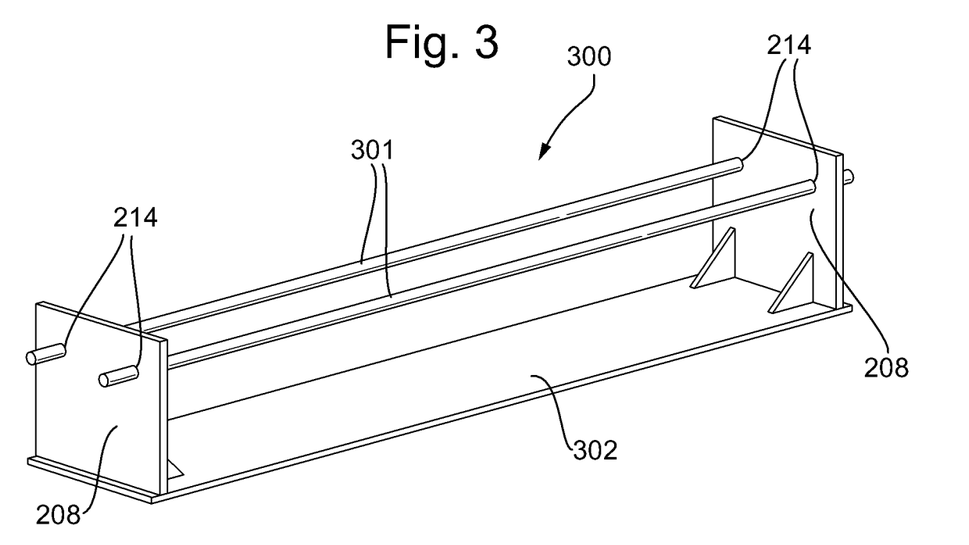
FIG. 3 is a schematic illustration (not to scale) showing a support structure.

FIG. 3 is a schematic illustration (not to scale) showing the assembled support structure. The remaining steps of the process of FIG. 1 will be described in more detail later below after a description of FIG. 3.

The support structure 300 comprises the two end portions 208, two tubes 301, and a base 302.

The tubes 301 are elongate, substantially straight tubes or pipes having substantially circular cross sections. In other words, the tubes 301 are long hollow cylinders. The tubes 301 are made of a carbon fibre composite (CFC) material.

The base 302 is a substantially flat panel having a substantially rectangular upper surface. The base 302 may be elongate. The base 302 may be made of any appropriate material, for example the base may be an Acrosoma® tri-dimensional stitched panel.

The end portions 308 are attached to the base 302 at opposite ends of the base 302, such that the end portions 208 extend substantially perpendicularly to the upper surface of the base 302.

Each tube 301 is positioned through an opposing pair of second through holes 214. Each tube 301 is arranged such that first end of that tube 301 is positioned through a second through hole 214 of one of the end portions 208, and a second end of that tube 301 (which is opposite to the first end of that tube 301) is positioned through a second through hole 214 of the other of the end portions 208. In this embodiment, the tubes 301 are substantially parallel with each other. Thus, the tubes 301 are retained by the end portions 208, i.e. the end portions 208 are retaining members for retaining the tubes 301. The tubes 301 may be retained at substantially fixed relative positions.

In some embodiments, the diameters of the second through holes 214 may be substantially equal to the external diameters of the tubes 301, thereby to ensure a snug fit between the end portions 208 and the tubes 301. This tends to provide that the ends of the tubes 301 are securely held by the end portions 208. Nevertheless, in some embodiments, the diameters of the second through holes 214 may be larger than the external diameters of the tubes 301, thereby to permit relative movement between the tubes 301 and the end portions 208.

Returning now to the description of FIG. 1, at step s10, the plurality of frames 206 are mounted to the support structure 300.

Figure 4:
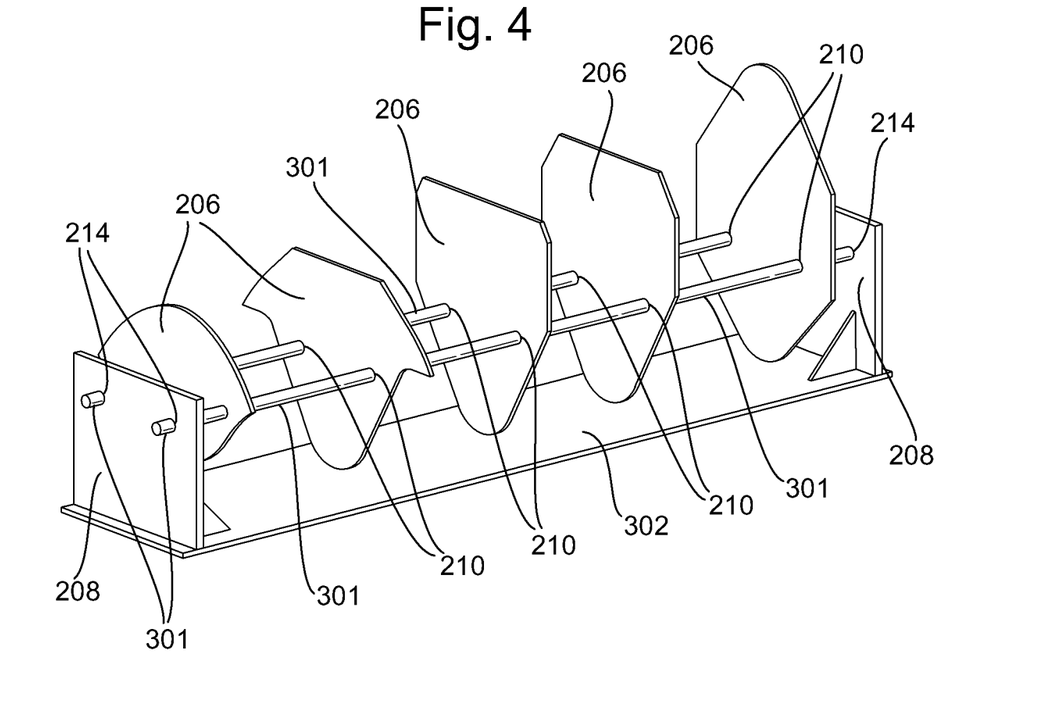
FIG. 4 is a schematic illustration (not to scale) showing a plurality of frames mounted to the support structure.

FIG. 4 is a schematic illustration (not to scale) showing the frames 206 mounted to the support structure 300. The remaining steps of the process of FIG. 1 will be described in more detail later below after a description of FIG. 4.

In this embodiment, each frame 206 is mounted to the support structure 300 by inserting each of the tubes 301 through a respective first through hole 210 of that frame 206. This may be performed by detaching ends of the tubes 301 from the end portions 208, and mounting the frame 206 onto the free ends of the tubes 301. The frames 206 are slid along the lengths of the tubes 301, and arranged such that each of the frames 206 occupies a desired respective location along the length of the tubes 301. Thus, the frames 206 are arranged in a spaced-apart arrangement along the length of the tubes 301. Preferably, the relative positions of the frames 206 are approximately as required in the final assembled airframe.

In this embodiment, the diameters of the first through holes 210 are larger than the external diameters of the tubes 301. This advantageously tends to allow for the frames 206 to be slid along the length of the tubes. Also, this tends to permit a degree of relative movement between the frames 206 during later attachment of the shear webs 204.

Returning now to the description of FIG. 1, at step s12, the plurality of shear webs 204 are attached to the frames 206.

Figure 5:
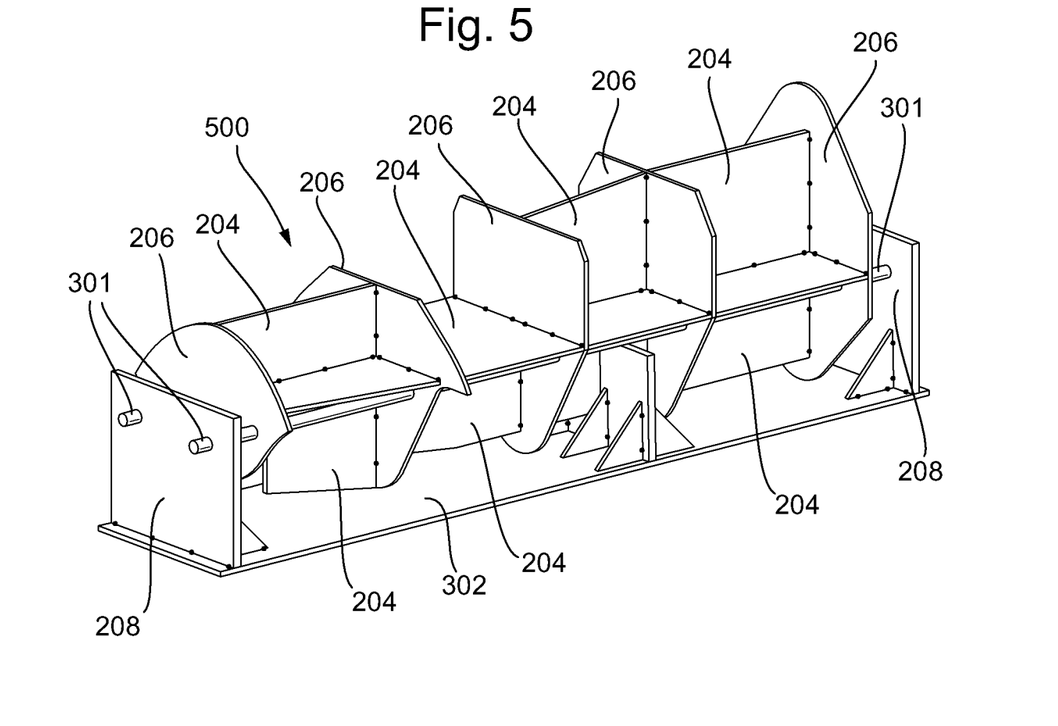
FIG. 5 is a schematic illustration (not to scale) showing an assembled airframe mounted to the support structure.

FIG. 5 is a schematic illustration (not to scale) showing the shear webs 204 attached between the frames 206, thereby the form an assembled airframe 500. The remaining step of the process of FIG. 1 will be described in more detail later below after a description of FIG. 5.

In this embodiment, each shear web 204 is attached between an adjacent pair of frames 206. A shear web 204 and the pair of frames 206 attached thereto forms an I-beam. In this embodiment the shear webs 204 are arranged in multiple different non-parallel (preferably, substantially perpendicular) planes, as shown in FIG. 5.

The shear webs 204 may be fastened to the frames 206 in any appropriate way, for example using fasteners that may be positioned through the fastener holes 212.

Advantageously, the relative movement of the frames 206 and the tubes 301 allowed by the first through holes 210 being oversized compared to the diameters of the tubes 301 tends to facilitate the correct, accurate attachment of the shear webs 204. For example, the frames 206 and shear webs 204 can be moved to ensure that the frames 206 and shear webs 204 are accurately positioned and properly engaged, and then subsequently fastened together.

Thus, the aircraft airframe 500 is assembled

Any gaps between the airframe components, such as between the frames 206 and the shear webs 204 and/or between the frames 206 and the tubes 301, may be filled with any appropriate material such as a liquid shim that may be cured after application.

Returning now to the description of FIG. 1, at step s14, in this embodiment, the base 302 and the end portions 208 are removed.

Thus, the airframe 500 is provided. The airframe 500 comprises the fastened together frames 206, the shear webs 204, and the tubes 301.

In this embodiment, a composite aircraft skin may be fastened to the airframe 500 thereby to form at least part (e.g. substantially all) of an aircraft fuselage. The outer shape of the fuselage is referred to as the Outer Mould Line (OML) of the fuselage. It tends to be desirable that the OML of the fuselage is within a pre-specified tolerance. The OML of the fuselage having the required tolerance is facilitated by the Inner Mould Line (IML) of the fuselage being within a pre-specified tolerance. The IML of the fuselage is the surface at which the airframe 500 and the aircraft skin abut, i.e. an outer surface of the airframe 500. Advantageously, the above-described method and apparatus tends to improve the accuracy of the IML of the airframe 500. Consequently, the accuracy of the OML of the fuselage tends to be improved.

An advantage provided by the above-described methods and apparatus is that the airframe is produced within very tight tolerance bounds that tend not to be possible using conventional production techniques. Thus, the assembly of the aircraft tends to be facilitated.

Advantageously, the above-described support structure avoids the use us of pickups for holding the airframe components. The weight and cost of the support structure tends to be reduced compared to conventional assembly jigs. Furthermore, as airframe components are not held by pickups, damage/stresses resulting from a component being held by pickups tends to be reduced. Instead, the airframe components are held by the plurality of tubes, which form part of the assembled airframe. Advantageously, the hollow tubes may be used to house, route or convey materials and structures through the airframe. For example, the tubes 301 may be used as fuel pipes to transport fuel through the aircraft, as air pipes to transport heating or cooling air through the aircraft, or for routing electrical wires and/or optical fibres.

Advantageously, the landings and other features of an airframe component are machined with high accuracy with respect to a local datum that is defined by features that are used to locate that airframe component on the support structure. Thus, in the assembled airframe, the landings and other features of the airframe components tend to be accurately located relative to each other. This tends to facilitate attachment of other aircraft structures to the airframe, such as pipes, electronic devices, electrical wiring/cables, other aircraft structural components (such as longerons), and the aircraft external skin. Furthermore, gaps or spaces between the airframe components advantageously tend to be minimised. The use shims to fills such gaps or spaces tends to be reduced or eliminated.

A further advantage provided by the above-described methods and apparatus is that non-destructive testing and other processes may be performed on individual airframe components separately. This tends to be difficult if, in contrast to the above-described method, multiple airframe components are machined as a set in an assembly jig.

The above-described methods and apparatus tends to reduce airframe assembly time, and cost. The use of expensive tooling may be reduced or eliminated.

The above-described assembly methods tend to be advantageously flexible to changes in fuselage size and shape for example.

The above-described assembled airframe tends to be lighter than airframes made of metal such as titanium, aluminium, or alloys thereof.

Advantageously, the above-described methods and apparatus tend to facilitate use of a monocoque structure of the aircraft external skin. For example, using the above systems and methods it tends to be easier to fit or slide a single shell external skin over the airframe.

The above-described methods and apparatus tend to facilitate build conditioning. For example, a first airframe component may be cut from a panel. This first airframe component may be measured (e.g. using a coordinate measuring machine (CMM)) to determine an error involved in the component definition and cutting process. Some or all airframe components that are subsequently cut from the panel (preferably at least those airframe components that are to be fitted to the first airframe component) may be modified to account for the determined error.

The above-described methods and apparatus tends to provide that the airframe is formed from similar materials, i.e. the use of dissimilar materials is reduced or avoided. This advantageously tends to reduce or eliminate the occurrence of galvanic corrosion between dissimilar materials. Also, this tends to reduce or eliminate a need for treatments that mitigate such corrosion.

It should be noted that certain of the process steps depicted in the flowchart of FIG. 1 and described above may be omitted or such process steps may be performed in differing order to that presented above and shown in FIG. 1. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the airframe components are formed from Acrosoma® tri-dimensional stitched panels. However, in other embodiments, one or more of the airframe components are formed from a different material, such as from composite materials having different structure, or from a metal (e.g. aluminium or titanium) or alloy.

In the above embodiments, the airframe components are cut from panels of material. However, in other embodiments, on or more for the airframe components is produced in a different way. For example, in some embodiments, one or more airframe components may be machined from a forging (e.g. a metal or alloy blank).

In the above embodiments, at step s14, the base and the end portions are removed from the assembled airframe. However, in some embodiments, one or both of the end portions and/or the base form part of the assembled airframe, and as such are not removed at step s14.

In the above embodiments, the airframe comprises the fastened together frames, the shear webs, and the tubes. However, in other embodiments, the airframe may include one or more further components in stead of or in additional to one or more frame or shear web. Examples of other airframe components that may be included in the airframe include, but are not limited to, longerons, keels, and beams. The other airframe components may be produced in the same way as the frames and shear webs. The other airframe components may be attached to the airframe while the airframe is mounted to the support structure.

In the above embodiments, the support structure comprises two tubes. However, in other embodiments, the support structure comprises a different number of tubes, for example more than two tubes (e.g. 2, 3, 4, 5, or more than 5 tubes).

In the above embodiments, the support structure comprises tubes. However, in other embodiments, one or more of the tubes is replaced by a different type of elongate member, such as a rod, i.e. a solid, non-hollow elongate member.

In the above embodiments, the support structure comprises tubes have circular cross-sections. However, in other embodiments, one or more of the tubes has non-circular cross-section.

In the above embodiments, the support structure comprises two end portions that retain the tubes. However, in other embodiments, the support structure comprises one or more further tube-retaining portions, for example an intermediate tube retaining portions that may be positioned between the two end portions. The one or more tube-retaining portions may comprise through holes through which the tubes are positioned.

In the above embodiments, an airframe of an aircraft is assembled. However, in other embodiments a frame or chassis of a different type of vehicle is assembled, for example a land-based or water-based vehicle.

What is claimed is:

1. A method of producing at least part of a structural frame of a vehicle, the method comprising:
   providing a support structure, the support structure comprising:
      a plurality of elongate members; and
      one or more retaining members configured to retain the elongate members;
   mounting a plurality of first structural components to the support structure by coupling the first structural components to the elongate members such that each of the first structural components occupies a different respective position along the elongate members; and
   attaching a plurality of second structural components to the first structural components, thereby coupling together the first structural components to form the at least part of the structural frame of the vehicle.

2. The method of claim 1 wherein the at least part of the structural frame of a vehicle is at least a part of an airframe of an aircraft.

3. The method of claim 1, wherein the first structural components are frames or formers.

4. The method of claim 1, wherein the second structural components are components selected from the group of components consisting of shear webs, longerons, beams, and keels.

5. The method of claim 1, wherein attaching the plurality of second structural components to the first structural components comprises attaching the second structural component between an adjacent pair of the first structural components.

6. The method of claim 1, wherein:
   each of the first structural components comprises a plurality of through holes; and
   for each of the first structural components, coupling the first structural components to the elongate members comprises positioning each elongate member through the respective through hole of the first structural component.

7. The method of claim 6, wherein a size of the each through hole is larger than the size of the cross section of the elongate member that is positioned through said through hole.

8. The method of claim 6, wherein coupling the first structural components to the elongate members such that each of the first structural components occupies a different respective position along the elongate members comprises sliding the first structural components along the elongate members.

9. The method of claim 1, wherein the elongate members are tubes.

10. The method of claim 1, further comprising:
    providing the plurality of first structural components, comprising:
       providing one or more panels of a material; and
       cutting the first structural components from the one or more panels.

11. The method of claim 10, wherein, for the first structural component:
    the first structural component comprises one or more features via which the first structural component is mounted to the elongate members; and
    the one or more features via which that first structural component is mounted to the elongate members define a datum with respect to which one or more other features of that first structural component are defined on the one or more panels.

12. The method of claim 11, wherein:
    the one or more features via which that first structural component is mounted to the elongate members comprises one or more through holes; and/or
    the one or more other features of the structural component comprises one or more features selected from the group of features consisting of fastener holes, landings for receiving other structural components, and an edge of the first structural component.

13. The method of claim 10, wherein each of the one or more panels comprise a core material sandwiched between opposing layers thereby to form a sandwich structure, the sandwich structure being stitched together by stitches passing through a thickness of the sandwich structure.

14. At least part of the structural frame of the vehicle produced in accordance with the method of claim 1.

15. The at least part of the structural frame of claim 14, wherein the plurality of first structural components comprises a plurality of through holes;
    the plurality of second structural components is selected from the group of components consisting of shear webs, longerons, beams, and keels; and
    the one or more retaining members is configured to retain the elongate members;
    wherein each said elongate member is configured to slideably receive the plurality of first vehicle structural components through the respective through hole of the first structural component and at different respective positions along the elongate members; and
    wherein the plurality of first structural members are configured to attach to the plurality of second vehicle structural components.

16. The at least part of the structural frame of claim 14, wherein the elongate members are tubes that form part of the structural frame.

17. The method of claim 1, wherein the elongate members are tubes that form part of the structural frame.

18. A support structure for use in assembling at least part of a structural frame of a vehicle, the support structure comprising:
- a plurality of elongate members, each elongate member configured to receive a plurality of vehicle structural components; and
- one or more retaining members configured to retain the elongate members.

19. The support structure of claim 18, wherein said plurality of vehicle structural components comprises:
- a plurality of first vehicle structural components comprising a plurality of through holes; and
- a plurality of second vehicle structural components selected from the group of components consisting of shear webs, longerons, beams, and keels; and
- wherein each said elongate member is configured to slideably receive the plurality of first vehicle structural components through a respective through hole of the first structural component and at different respective positions along the elongate members; and wherein the plurality of second vehicle structural members are configured to attach to the first vehicle structural components.

20. The method of claim 1 for producing at least part of a structural frame of a vehicle, wherein each of the first structural components comprises a plurality of through holes; and
- for each of the first structural components, coupling the first structural components to the elongate members comprises positioning each elongate member through a respective through hole of the first structural component;
- coupling the first structural components to the elongate members such that each of the first structural components occupies a different respective position along the elongate members comprises sliding the first structural components along the elongate members; and
- wherein the second structural components are components selected from the group of components consisting of shear webs, longerons, beams, and keels.

* * * * *